United States Patent
Ishii

(10) Patent No.: US 6,223,159 B1
(45) Date of Patent: Apr. 24, 2001

(54) SPEAKER ADAPTATION DEVICE AND SPEECH RECOGNITION DEVICE

(75) Inventor: Jun Ishii, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/217,928

(22) Filed: Dec. 22, 1998

(30) Foreign Application Priority Data

Feb. 25, 1998 (JP) .................................................. 10-043051

(51) Int. Cl.$^7$ ................................................... G10L 15/14
(52) U.S. Cl. ......................................... 704/256; 704/247
(58) Field of Search .................................... 704/251, 231, 704/256, 255, 250, 200, 201, 257, 240, 247, 252

(56) References Cited

U.S. PATENT DOCUMENTS

| | | | |
|---|---|---|---|
| 5,839,105 | * 11/1998 | Ostendorf et al. ................... | 704/256 |
| 5,864,810 | * 1/1999 | Digalakis et al. ................... | 704/255 |
| 5,956,676 | * 9/1999 | Shinoda .............................. | 704/244 |
| 5,983,178 | * 11/1999 | Naito et al. ........................ | 704/245 |
| 6,006,184 | * 12/1999 | Yamada et al. ..................... | 704/246 |
| 6,073,096 | * 6/2000 | Gao et al. ........................... | 704/245 |

OTHER PUBLICATIONS

IEE Proceedings. Mercier et al., "Recognition of speaker dependent continuous speech with KEAL ". vol. 136, Pt. I, No. 2., pp. 145–154. Apr. 1989.*

Kosaka, et al, Technical Report by Electronic Information Communications Association, SP 93 to 110 1993, pp. 49–54.

Ohkura, et al, Technical Report by Electronic Information Communications Association, SP 92 to 16, 1992, pp. 23–28.

Rabiner, et al, NTT Advanced Technology Company Ltd. 1995.

Gales, et al, Computer Speech and Language 10, 1996, pp. 249–264.

Lee, et al, IEEE Transaction, Signal Processing, vol. 39, No. 4, 1991, pp. 806–814.

* cited by examiner

*Primary Examiner*—Richemond Dorvil

(57) ABSTRACT

Voice feature quantity extractor extracts feature vector time-series data by acoustic feature quantity analysis of the speaker's voice. Reference speaker-dependent conversion factor computation device computes reference speaker-dependent conversion factors through use of a reference speaker voice data feature vector and an initial standard pattern. The reference speaker-dependent conversion factors are stored in a reference speaker-dependent conversion factor storage device. Speaker-dependent conversion factor selector selects one or more sets of reference speaker-dependent conversion factors stored in the reference speaker-dependent conversion factor storage device. Speaker-dependent conversion factor computation device computes speaker-dependent conversion factors, through use of the selected one or more sets of reference speaker-dependent conversion factors. Speaker-dependent standard pattern computation device converts parameters of the initial standard pattern, through use of the speaker-dependent conversion factors, and thus-converted parameters are output as a speaker-dependent standard pattern.

10 Claims, 8 Drawing Sheets

SPEAKER ADAPTATION DEVICE AND SPEECH RECOGNITION DEVICE

BACKGROUND OF THE INVENTION

1. Field of the Invention

The present invention relates to a speaker adaptation device which selects one of a plurality of prepared standard patterns on the basis of the speech characteristics of a speaker, as well as to a speech recognition device which recognizes speech through use of the thus-selected speaker-dependent standard pattern.

2. Description of the Related Art

As shown in FIG. 7, in a speaker adaptation device described in, for example, Kosaka et al., "Structured Speaker Clustering for Speaker Adaptation" (Technical Report by Electronic Information Communications Association, SP 93 to 110, 1993), voice feature quantity extraction means 1 subjects a speaker's voice 101, which will be separately input, to an acoustic feature quantity analysis, thereby extracting feature vector time-series data Ou=[ou(1), ou(2), ... , ou(Tu)] (where Tu represents the maximum number of speaker voice frames). Speaker-dependent standard pattern selection means 6a selects and outputs as a speaker-dependent standard pattern 104 a speaker-dependent standard pattern which has the maximum probability of matching the speaker's voice 101, selects a reference speaker-dependent standard pattern from reference speaker-dependent standard pattern storage means 9, and subjects the thus-selected reference speaker-dependent standard pattern to hidden Markov model (HMM) probability computation, through use of the feature vector time-series data extracted by the speech feature quantity extraction means 1. Reference speaker-dependent standard pattern learning means 7 generates reference speaker-dependent standard patterns λs (1) to λs(M) for reference speaker numbers 1 to M, through use of a reference speaker speed data feature vector 102 and an initial standard pattern 103, which are prepared separately. With the reference speaker-dependent standard patterns λs (1) to λs(M), an adaptive mean vector $\mu al(j,k)$ is estimated and learned from the speech data regarding a speaker 1, with regard to a k-th HMM mean vector $\mu l(j,k)$ in state "j," which is the initial standard pattern 103, by means of a transfer-vector-field smoothing speaker adaptation method (for further information about the method, see Okura et al., "Speaker Adaptation Based on Transfer Vector Field Smoothing Model with Continuous Mixture Density HMMs", Technical Report by Electronic Information Communications Association, SP 92 to 16, 1992). Reference speaker-group-dependent pattern learning means 8 defines and clusters the distance among the reference speaker-dependent standard patterns λs(1) to λs(M) produced by the reference speaker-dependent standard pattern learning means 7, by means of a Bhattacharyya distance to thereby produce reference speaker-group-dependent standard patterns λg(1) to λg(N) for reference speaker group numbers 1 to N, through use of reference speaker-dependent standard patterns which are grouped by means of, e.g., K-mean algorithm (for further information about the algorithm, see L. Rabiner et al., "Fundamentals of Speech Recognition," translated by Kei FURUI, NTT Advanced Technology Company Ltd., 1995). Reference speaker-dependent standard pattern storage means 9 stores the reference speaker-dependent standard patterns λs(1) to λs(M) produced by the reference speaker-group-dependent standard pattern learning means 7 and the reference speaker-group-dependent standard patterns λg(1) to λg(N) produced by the reference-speaker-dependent standard pattern learning means 8.

The conventional speaker adaptation device adopts a speaker adaptation method (a speaker adaptation method based on standard pattern selection). Under this method, a plurality of reference speaker-dependent standard patterns are prepared beforehand, through use of a hidden Markov model [HMM, or an speaker independent standard pattern which is described in detail in, e.g., "Fundamentals of Speech Recognition" and is prepared beforehand from speech data regarding an speaker-independent speaker (such as words or sentences) through standard pattern learning operations]. A speaker-dependent standard pattern is selected on the basis of the characteristics of the speaker's speech.

The reference-speaker-group-dependent standard pattern learning means 8 estimates the k-th mean vector $\mu gn$ (j,k) and a covariance matrix Ugn (j,k) about group "n" which is in state "j" with regard to the generated reference-speaker-group standard pattern, by means of Equation 1 provided below. Here, $\mu gn(j,k)$ represents the i-th mean vector in the group "n" with regard to the reference speaker-dependent standard pattern, and uai (j,k) represents a covariance matrix. Further, I represents the number of reference speaker-dependent standard patterns in the group "n," and "t" represents a transposed matrix.

(Equation 1)

$$\mu gn(j,k) = \frac{1}{I}\sum_{i=1}^{I} uai(j,k) \qquad \text{Eq.1}$$

$$Ugn(j,k) = \frac{1}{I}\left(\sum_{i=1}^{I} Uai(j,k) + \sum_{i=1}^{I} uai(j,k)uai(j,k)^t - I \cdot ugn(j,k)ugn(j,k)^t\right)$$

The reference speaker-dependent standard pattern storage means 9 uses an HMM having an initial HMM Gaussian distribution number of 810 whose mean vector dimension number is 34 per-standard pattern. For example, with regard to a standard pattern number of 484 which is a sum of a reference speaker-dependent standard pattern number of 279 and a reference speaker-group-dependent standard pattern number of 205, there must be stored 13,329,360 data sets (=484×810×34) for merely a mean vector.

The speaker's voice 101 corresponds to the voice produced as a result of a speaker using the system speaking predetermined words or sentences beforehand.

The reference speaker speech data feature vector 102 corresponds to a feature vector (e.g., a physical quantity expressing the voice characteristics in a small amount of data, such as Cepstrum or a Cepstrum differential) which is extracted by subjecting multiple speaker voice data to an acoustic feature quantity analysis. In the case of the number of reference speakers being M, there are feature vector time-series data O(1) to O(M) [O(1) designates time-series signals {o (1,1), o (1,2), ... , o (1,T1)}, where T1 is the number of speech data frames of a reference speaker 1].

The initial standard pattern 103 corresponds to an initial standard pattern λI[e.g., 200 states (5 mixture/state) phoneme HMM and 1 state (10 mixture) silent HMM] prepared beforehand.

For example, as shown in FIG. 8, in the common speech recognition device which uses a conventional speaker adaptation method based on standard pattern selection, the voice feature quantity extraction means 11 operates for a speaker's voice 101a to be recognized (i.e., the voice produced as a result of a speaker using the system speaking words and sentences to be recognized), which will be input separately, in the same manner as used by the voice feature quantity extraction means 1 shown in FIG. 6A. Matching means 12 recognizes speech from the feature vector time-series data produced by the voice feature quantity extraction means 11, by comparison of the time-series data with the speaker-dependent standard pattern 104 produced by the speaker adaptation device based on the standard pattern selection method.

Compared with a speaker adaptation method based on a mapping method [a structural model introduction method regarding a personal error under which a mapping relationship derived between an initial standard pattern and a speaker's standard pattern by means of a small amount of learned data, e.g., a specific standard pattern learning method which uses a conversion factor obtained by means of a multiple regression mapping model and which is described in "M. J. F. Gales et al. , Means and Variance Adaptation within the MLLR Framework," Computer Speech and Language 10, pp. 249 to 264, 1996] or the speaker adaptation method based on a Statistical Estimation Method [e.g., a method of utilizing knowledge based on a previously-obtained initial standard pattern at the time of estimation of a standard pattern from newly-acquired learned data, the method being described in "C. H. Lee et al., A Study on Speaker Adaptation of the Parameters of Continuous Density Hidden Markov Models, IEEE Transaction, Signal Processing, Vol. 39, No. 4, pp. 806 to 814, 1991], the conventional speaker adaptation device based on the standard pattern selection method enables correct adaptation of a speaker through use of a smaller amount of learning data. However, if there is an increase in the number of standard patterns to be stored during speaker adaptation—in which a speaker-dependent standard pattern is selected from reference speaker-dependent standard patterns on the basis of the speaker's voice—as a natural result there is an increase in the amount of data representing the reference speaker-dependent standard pattern.

SUMMARY OF THE INVENTION

The present invention has been made to solve the above problems,and therefore an object of the invention is to provide a speaker adaptation method (or a speaker adaptation method based on a data reduction standard pattern selection method), wherein a plurality of conversion factors representing standard patterns are prepared by means of a speaker adaptation device and a speech recognition device, and wherein the conversion factors are selected on the basis of the characteristics of the speaker's voice.

A speaker adaptation device according to the present invention is characterized by using the following means in order to solve the foregoing drawbacks, as well as by adopting a speaker adaptation method based on a data reduction standard pattern selection method.

Further, a speech recognition device relevant to the present invention characterized by comprising the speaker adaptation device.

Voice feature quantity extraction means extracts feature vector time-series data through acoustic feature quantity analysis of a speaker's voice, which is input separately.

The reference speaker-dependent conversion factor computation means computes reference speaker-dependent conversion factors through use of a reference speaker voice data feature vector and an initial standard pattern, both of which will be prepared separately. The thus-computed reference speaker-dependent conversion factors are stored in the reference speaker-dependent conversion factor storage means. Further, the reference speaker-dependent conversion factor computation means computes, with regard to the reference speaker voice data feature vector, reference speaker-dependent conversion factors for each reference speaker, each reference speaker group including a plurality of reference speakers, or each reference speaker as well as each reference speaker group including a plurality of reference speakers.

The thus-computed reference speaker-dependent conversion factors are stored in the reference speaker-dependent conversion factor storage means. Furthermore, the reference speaker-dependent conversion factor computation means computes reference speaker-dependent conversion factors for each parameter group divided into a plurality of segments with regard to the initial standard pattern, or each reference speaker group including reference speakers with regard to the reference speaker data feature vector as well as each parameter group divided into a plurality of segments with regard to the initial standard pattern; and wherein the thus-computed reference speaker-dependent conversion factors are stored in the reference speaker-dependent conversion factor storage means. The reference speaker-dependent conversion factor computation means computes reference speaker-dependent conversion factors by means of computation of a conversion matrix and a constant vector, both of which depend on each reference speaker, by means of computation of only a conversion constant vector depending on each reference speaker, orbymeansof combinedcomputation of a conversion matrix and a constant vector, both of which depend on each reference speaker, and a conversion constant vector depending on each reference speaker.

The speaker-dependent conversion factor selection means selects one or more reference speaker-dependent conversion factors having great conversion factor similarity by computation of similarity between the speaker-dependent conversion factors—produced through use of the feature vector time-series data extracted by the acoustic characteristic quantity extraction means and the initial standard pattern—and the reference speaker-dependent conversion factor stored in the reference speaker-dependent conversion factor storage means, one or more reference speaker standard pattern conversion factors in order of probability from the largest to the lowest by computation of probability of the feature vector time-series data extracted by the voice feature quantity extraction means with regard to the reference speaker-dependent standard pattern produced through use of the reference speaker-dependent conversion factor stored in the reference speaker-dependent conversion factor storage means and the initial standard pattern, or one or more reference speaker standard pattern conversion factors having great conversion factor similarity, and great likelihood; and wherein the speaker-dependent conversion factor computation means computes speaker-dependent conversion factors through use of the thus-selected one or more reference speaker-dependent conversion factors, or one or more reference speaker standard pattern conversion factors.

The speaker-dependent conversion factor computation means subjects to weighed averaging operations the one or more sets of reference speaker-dependent conversion factors selected by the speaker-dependent conversion factor selection means, thereby computing one or more sets of speaker-dependent conversion factors. The reference speaker-dependent conversion factor computation means computes a reference speaker-dependent conversion factor which converts a mean vector, by means of an element distribution function constituting a symbol output probability density function of the continuous mixture distribution hidden Markov model used as the initial standard pattern, i.e., a Gaussian distribution function or a Laplace distribution function.

Speaker-dependent standard pattern computation means converts parameters of the initial standard pattern through use of the speaker-dependent conversion factors computed by the speaker-dependent conversion factor computation means and which outputs the thus-converted parameters as a speaker-dependent standard pattern.

Further, a continuous mixture distribution hidden Markov model is used as the initial standard pattern.

DETAILED DESCRIPTION OF THE PREFERRED EMBODIMENTS

Figure 1:
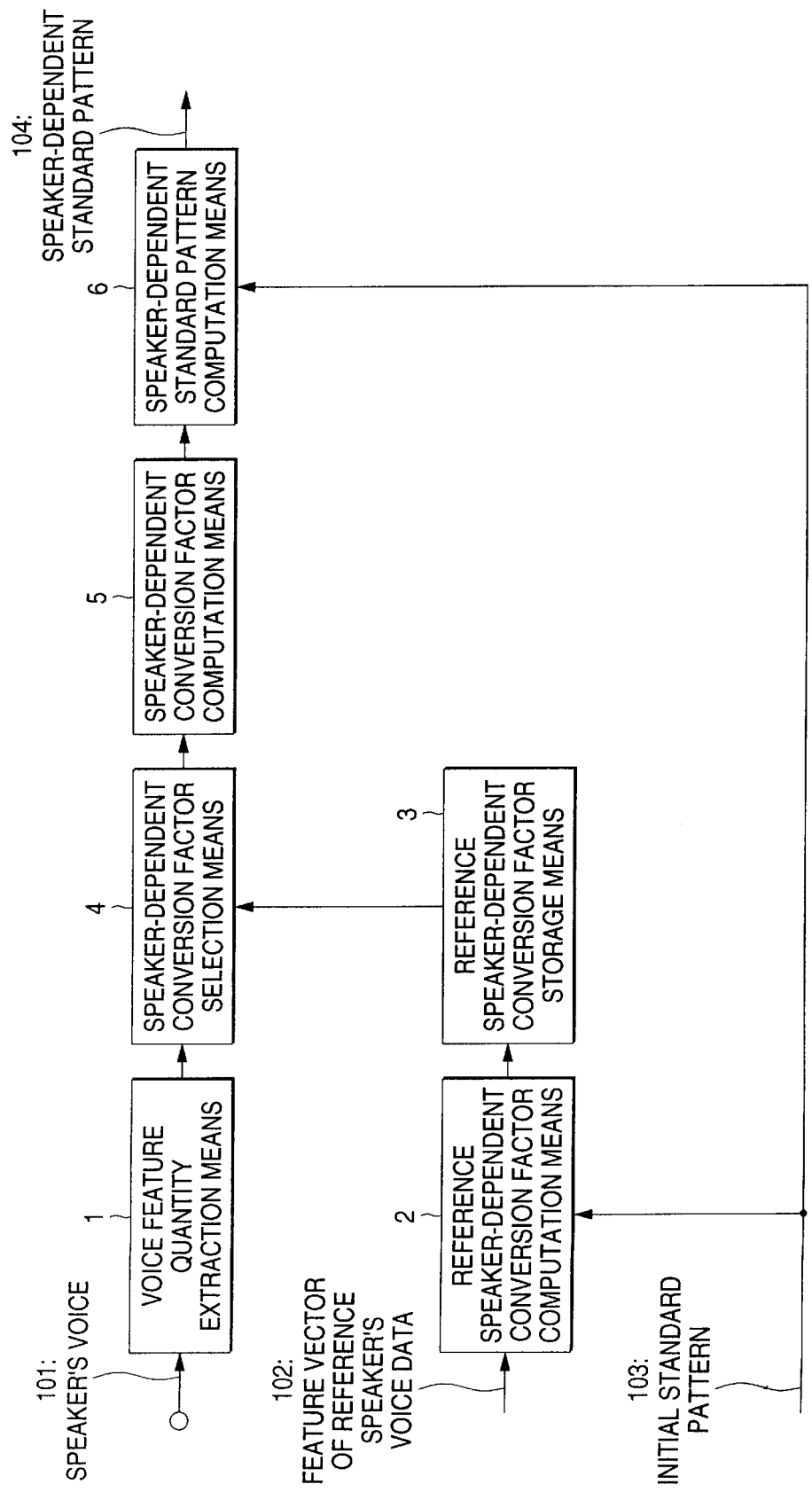
FIG. 1 is a functional block diagram showing a speaker-adaptation device according to a first embodiment of the present invention.
Figure 7:
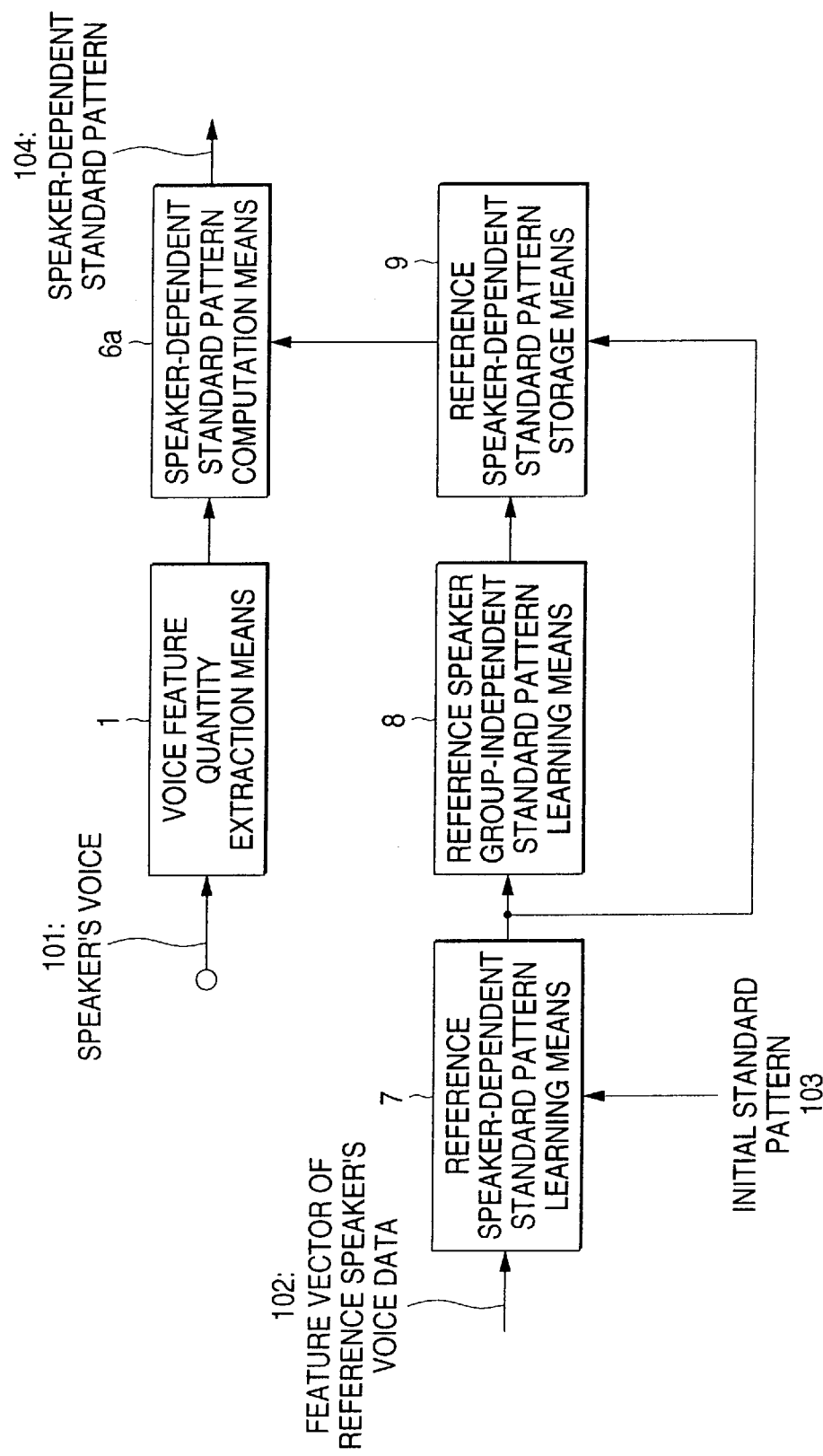
FIG. 7 is a functional block diagram showing a speaker-adaptation device according to the prior art.

As shown in FIG. 1, in a speaker adaptation device according to one embodiment of the present invention, voice feature quantity extraction means 1 corresponds to that used in the conventional speaker-adaptation device shown in FIG. 7. Reference speaker-dependent conversion factor computation means 2 computes reference speaker-dependent conversion factors Tr(1) to Tr(L)(L represents the number of sets of conversion factors) for the purpose of obtaining reference speaker-dependent standard patterns, through use of a reference speaker speech data feature vector 102 and an initial standard pattern 103. The thus-computed reference speaker-dependent conversion factors Tr(1) to Tr(L) are stored in reference speaker-dependent conversion factor storage means 3. Speaker-dependent conversion factor selection means 4 selects one or more sets of reference speaker-dependent conversion factors Trc (1) to Trc (Lc) (Lc represents the number of sets of conversion factors to be selected) from the reference speaker-dependent conversion factors Tr(1) to Tr(L) stored in the reference speaker-dependent conversion factor storage means 3. Speaker-dependent conversion factor computation means 5 computes a speaker-dependent conversion factor Trm for the purpose of converting an initial standard pattern, through use of one or more sets of reference speaker-dependent conversion factors Trc(1) to Trc(Lc) selected by the speaker-dependent conversion factor selection means 4. Speaker-dependent standard pattern computation means 6 converts the parameters of the initial standard pattern 103, which will be prepared separately, through use of the speaker-dependent conversion factor Trm computed by the speaker-dependent conversion factor computation means 5. The thus-computed parameters are output as a speaker-dependent standard pattern 104. Accordingly, the number of standard patterns to be prepared beforehand can be reduced.

The speaker adaptation device according to the present embodiment employs a speaker adaptation method (i.e., a speaker adaptation method based on a data reduction standard pattern selection method), wherein a plurality of conversion factors representing standard patterns are prepared beforehand, and the conversion factor is selected on the basis of the characteristics of the speaker's voice.

The reference speaker-dependent conversion 10 factor computation means 2 and the reference speaker-dependent conversion factor storage means 3 may employ either a linear reference speaker-dependent conversion factor or a non-linear reference speaker-dependent conversion factor. Further, in the case of a continuous mixture distribution HMM, parameters to be converted comprise a transition probability, a Gaussian distribution mean vector, a covariance matrix, a mixture weighting factor, and a duration control parameter. Provided that a constant vector is v(l) and a parameter of an initial standard pattern is pi, a standard pattern pa(l)=pi+v(l) is obtained for the reference speaker 1. Further, provided that the number of data sets required to represent one set of conversion factors is Td(l) ["l" designates the number of sets 1 to L (i.e., the number of conversion factor sets)] and the number of data sets required to represent the initial reference patter is Id, there is obtained a required number of data sets to be stored Td(total)=Id+ $\Sigma_1$Td(l) (where l=1 to L). Compared with IdxL required by the conventional standard pattern selection method, the number of sets required to be stored is reduced, so long as a requirement of IdxL>Td(total) is satisfied.

The reference speaker-dependent conversion factor computation means 2 according to the present embodiment shown in FIG. 1 may be formed as reference speaker-dependent conversion factor computation means 2a through use of reference single-speaker-dependent conversion factor computation means 21, which will be provided separately. The reference speaker-dependent conversion factor computation means 2a computes reference speaker-dependent conversion factors Trs (1) to Trs (M) for each speaker, through use of the reference speaker-dependent voice data feature vectors O(1) to O(M) 102 for each reference speaker and the initial standard pattern 103. The thus-computed reference single-speaker-dependent conversion factors Trs (1) to Trs (M) are output to the reference speaker-dependent conversion factor storage means 3. By means of conversion factor computation [IdxM>Td(total)] for each reference speaker, the number of data sets required for storing the standard patterns beforehand can be reduced to a much greater extent.

Figure 2A:
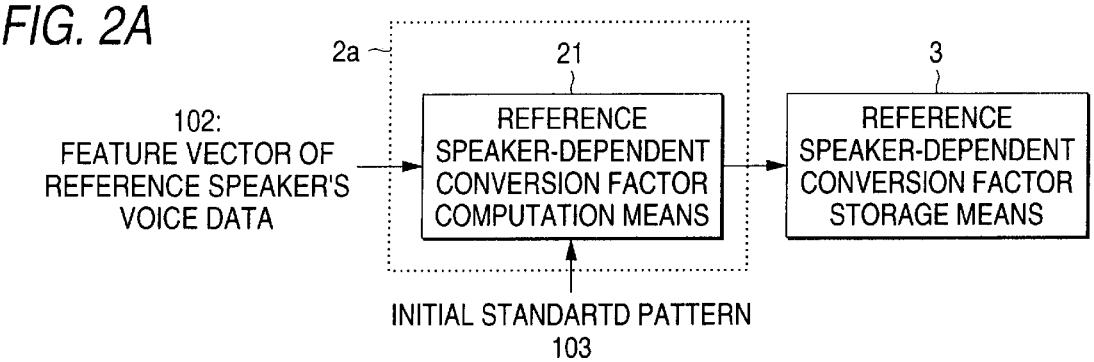
FIGS. 2A to 2C are block diagrams for describing three other modifications of the reference speaker-dependent conversion factor computation means shown in FIG. 1.
Figure 2B:
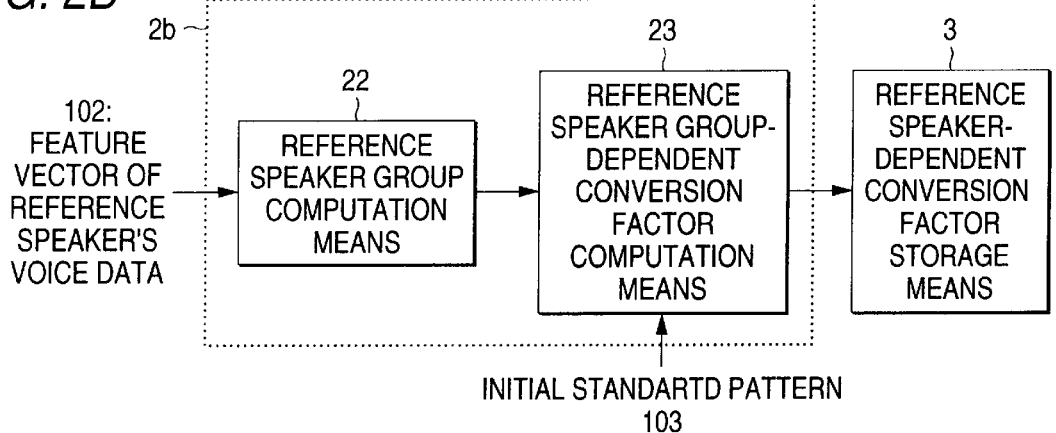

Further, as shown in FIG. 2B, the reference speaker-dependent conversion factor computation means 2 maybe formed as reference speaker-dependent conversion factor computation means 2b. The reference speaker-dependent conversion factor computation means 2b comprises reference speaker group computation means 22, which will be provided separately and which clusters the reference speakers using voice data feature vector 102 and groups the speaker into N groups consisting of one or more reference speakers, such as groups g(1) to g(N). Further, the reference speaker-dependent conversion factor computation means 2b comprises reference speaker group-dependent conversion factor computation means 23, which will be provided separately and which computes reference speaker-dependent conversion factors Trg(1) to Trg(N) for each reference speaker group, through use of reference speaker voice data feature vectors Og(1) to Og(N) 102 provided for each group and the initial standard pattern 103. The thus-computed reference speaker group-by-group-dependent conversion factors Trg(1) to Trg(N) are output to the reference speaker-dependent conversion factor storage means 3. By means of conversion factor computation [Id×N>Td(total)] for each reference speaker group consisting of a plurality of speakers, the number of data sets required for storing the standard patterns beforehand can be reduced to a much greater extent.

Figure 2C:
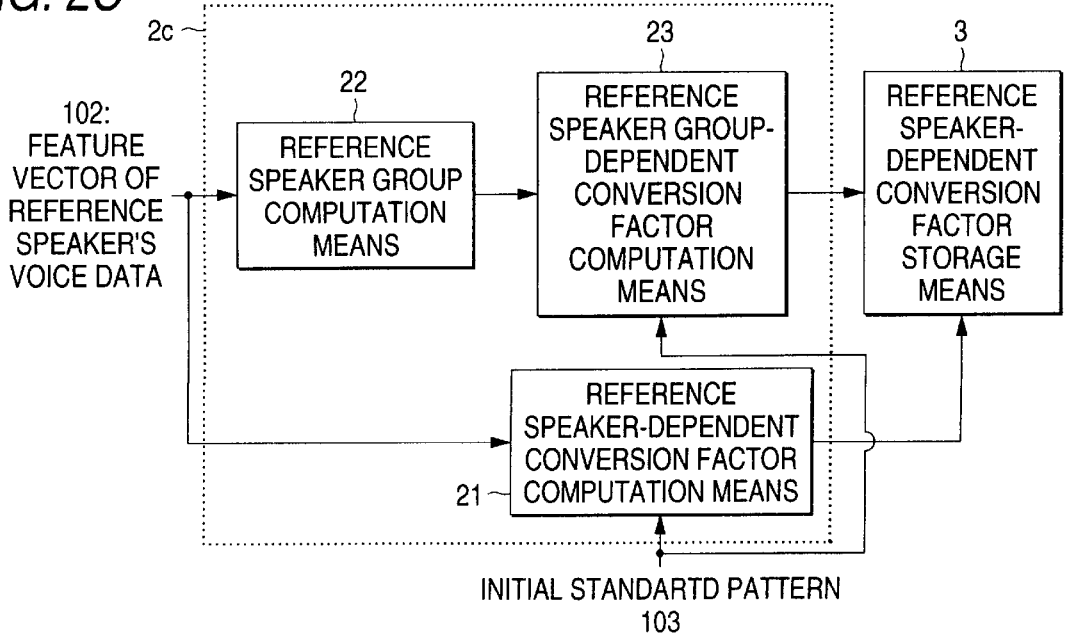

As shown in FIG. 2C, the reference speaker-dependent conversion factor computation means 2 may be formed as reference speaker-dependent conversion factor computation means 2c, which will be provided separately. The reference speaker-dependent conversion factor computation means 2c comprises the reference single-speaker-dependent conversion factor computation means 21, the reference speaker group computation means 22, and the reference speaker group-dependent conversion factor computation means 23. As a result of computation [Id×(M+N)>Td(total)], which is a combination use of conversion factor computation for each reference speaker and conversion factor computation for each reference speaker group consisting of a plurality of reference speakers, the number of data sets required for storing the standard patterns beforehand can be reduced to a much greater extent.

Figure 3A:
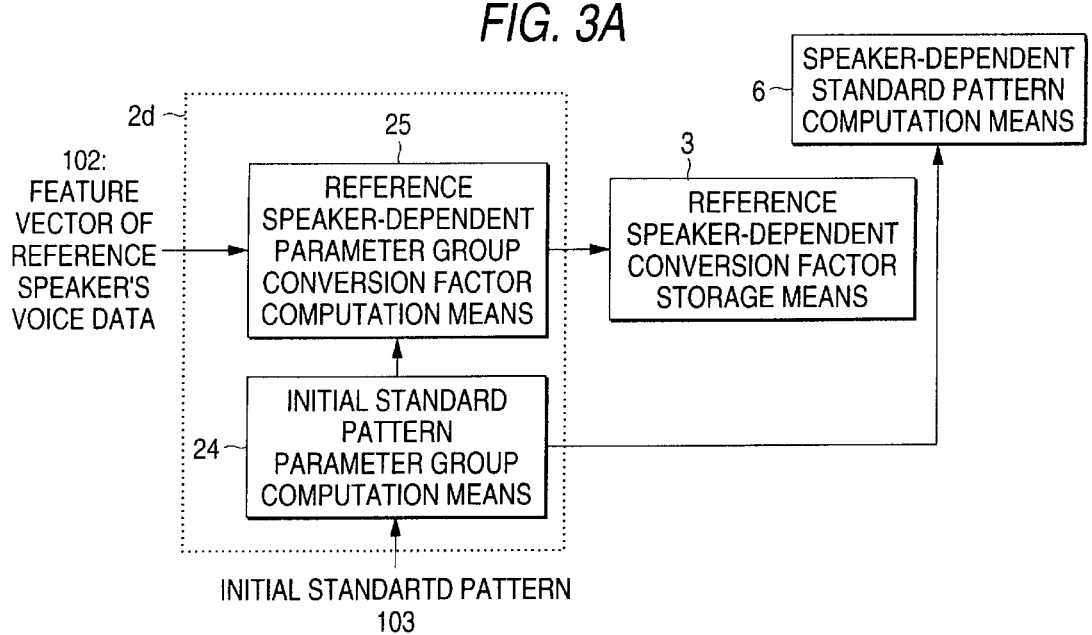
FIGS. 3A and 3B are block diagrams for describing two other modifications of the reference speaker-dependent conversion factor computation means shown in FIG. 1.

Further, as shown in FIG. 3A, the reference speaker-dependent conversion factor computation means 2 maybe formed into reference speaker-dependent conversion factor computation means 2d. The reference speaker-dependent conversion factor computation means 2d comprises initial standard pattern parameter group computation means 24 and reference speaker-dependent parameter group conversion factor computation means 25, which are provided separately. The initial standard pattern parameter group computation means 24 clusters the initial standard pattern 103 through use of the parameters and groups the pattern into a plurality of parameter groups λI(1) to λI(P) (where P represents the number of groups). The parameter groups λI(1) to λI(P) are output to the speaker-dependent standard pattern computation means 6. The reference speaker-dependent parameter group conversion factor computation means 25 computes reference speaker-dependent conversion factors Trss(p,l) for each parameter group (p=1,2, . . . p; l=1,2, . . . , L; wherein P represents the number of standard pattern groups to be divided; and L represents the number of sets of conversion factors), through use of the parameter group initial standard pattern 103 computed for each parameter group by the initial standard pattern parameter group computation means 24 and the reference speaker voice data feature vector 102. The thus-computed reference speaker-dependent conversion factors are output to the reference speaker-dependent conversion factor storage means 3. By means of the conversion factor computation $$[IdxL > Td'(total), Td'(total) = \sum_{p=1}^{P}\sum_{l=1}^{L} Td(p, l),$$

wherein Td (p,l) represents the number of data sets required to express the conversion factor Trss (p,l)] performed for each of the parameter groups into which the initial standard pattern 103 is divided, the number of data sets required for storing the standard patterns beforehand can be reduced to a much greater extent.

Figure 3B:
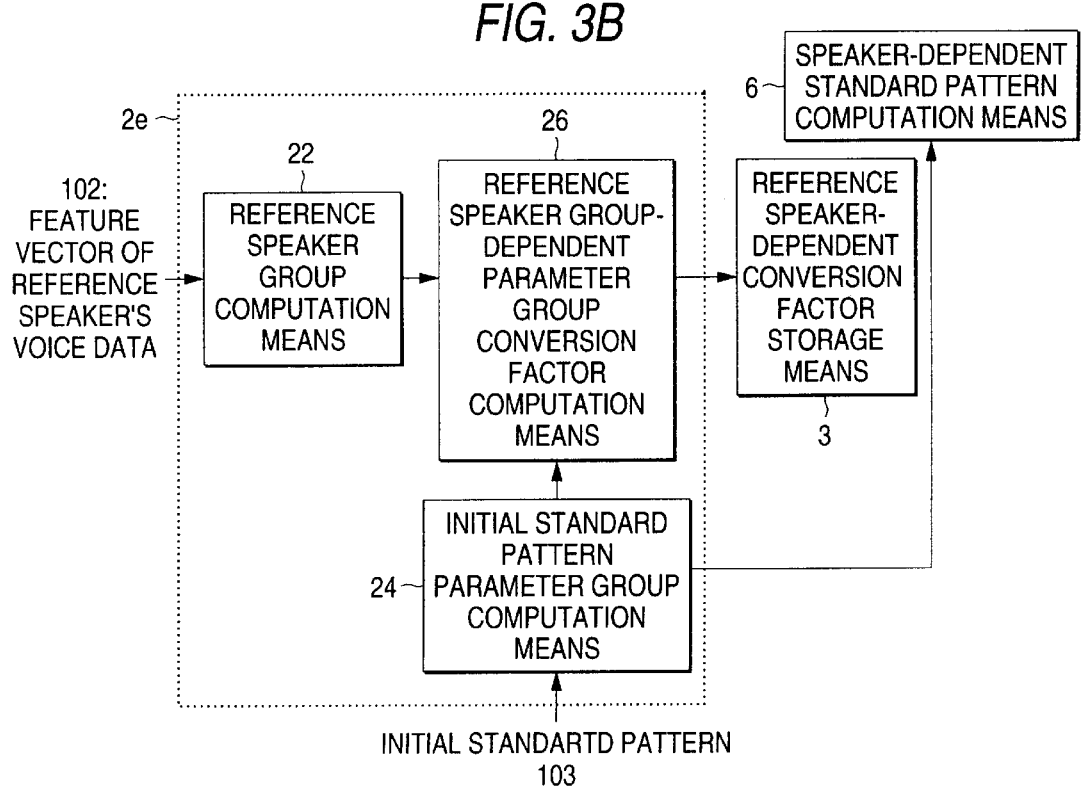

As shown in FIG. 3B, the reference speaker-dependent conversion factor computation means 2 may be formed as reference speaker-dependent conversion factor computation means 2e. The reference speaker-dependent conversion factor computation means 2e comprises, the reference speaker group computation means 22, the initial standard pattern parameter group computation means 24, and reference speaker group-dependent parameter group conversion factor computation means 26, all of which will be provided separately. The reference speaker-dependent conversion factor computation means 2e computes a reference speaker group-dependent parameter group conversion factor, through use of the reference speaker voice data feature vectors Og(1) to Og(N) 102 computed for each reference speaker group by the reference speaker group computation means 22, as well as of the initial standard pattern 103 computed for each parameter group by the initial reference parameter group. The thus-computed reference speaker group-dependent parameter group conversion factor is output to the reference speaker-dependent conversion factor storage means 3. As a result of computation ([IdxL'>Td' (total)], where L' represents the number of reference speaker groups) which is a combination use of conversion factor computation for each reference speaker group and conversion factor computation for each initial standard pattern parameter group, the number of data sets required for storing the standard patterns beforehand can be reduced to a much greater extent.

Figure 4A:
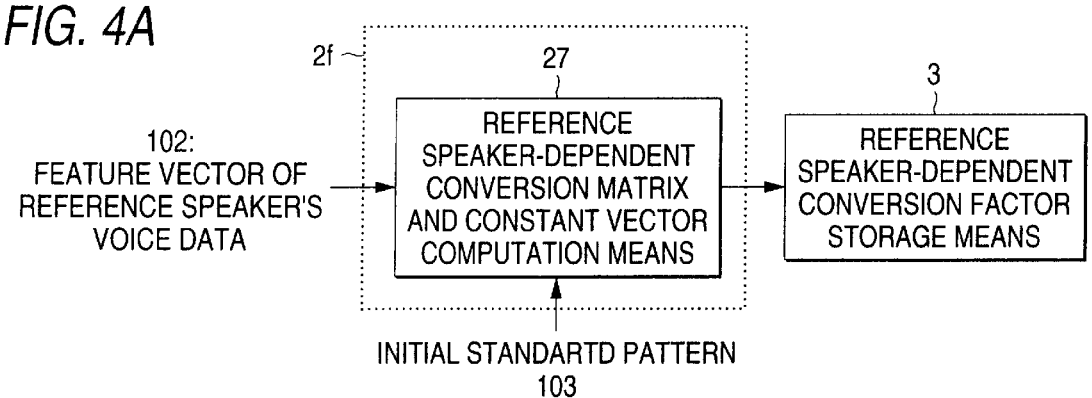
FIGS. 4A to 4C are block diagrams for describing three other modifications of the reference speaker-dependent conversion factor computation means shown in FIG. 1.

As shown in FIG. 4A, the reference speaker-dependent conversion factor computation means 2 may be formed as reference speaker-dependent conversion factor computation means 2f. The reference speaker-dependent conversion factor computation means 2f comprises reference speaker-dependent conversion matrix constant and vector compute means 27, which will be provided separately. The reference speaker-dependent conversion matrix and constant vector computation means 27 computes a conversion matrix A(l) and a conversion constant vector v(l) depending on each reference speaker. The thus-computed reference speaker-dependent conversion matrix and constant vector are output to the reference speaker-dependent conversion factor storage means 3. The number of data sets required for storing standard patterns to be prepared beforehand can be reduced to a much greater extent.

For example, when converting, for each reference speaker, the Gaussian distribution mean vectors of HMM of the initial standard pattern 103 is the conversion parameters, the reference speaker-dependent conversion matrix and constant vector computation means 27 obtains the conversion matrix A(l) and the conversion constant vector v(l) that generate the l-th reference speaker-dependent mean vector $\mu l(j,k)$ of k-th mixture in state j by conversion of initial mean $\mu i(j,k)$ of initial standard pattern 103 by using Equation 2(1). Here, $\mu l(j,k)$ and $\mu a l(j,k)$ represent d-dimensional vectors; A(l) represents a dxd matrix; and v(l) represents a d-dimensional constant vector. As shown in Equation 2(2), an element function of an output probability density function of a feature vector o(l,t) in the Gaussian distribution "k" in state "j" is defined with regard to A(l) and v(l), through computation of, e.g., HMM probability described in the foregoing mapping publication. Subsequently, as shown in Equations 2(3) and 2(4), A(l) and v(l) are subjected to partial differentiation and are taken as equaling zero on the basis of the output probability density function, through use of an initial HMM$\lambda$i of the initial standard pattern 103 and the reference speaker voice data feature vectors o(l,1) to o(l,T1) 102 (where T1 represents the maximum number of frames of voice data feature vector of speaker 1), whereby A(l) and v(l) representing the maximum value of a "Baum's auxiliary function" is computed. Here, F represents probability; $\theta$ represents series of state which a HMM can assume; $\lambda$i represents a HMM parameter set before re-estimation; $\lambda$i' represents a HMM parameter set after re-estimation; and $\gamma$ (t,j,k) represents an expected value at which a feature vector is observed in Gaussian distribution "k" in state "j" at time "t." Further, as shown in Equation 2(5) derived from Equation 2(4), p-th line of A(l) [a (l,p, 1), a (l,p, 2), . . . , a (l,p,d)] and p-th element of v(l) v(l,p) are simultaneously computed. Here, $\mu$i(j,k,r) represents the r-th element of an initial HMM mean vector $\mu$i (j,k) in the Gaussian distribution "k" in state "j"; $\sigma^2$ (j,k,p) represents a (p,p) element of a covariance matrix Ui (j,k); and o(l,t,p) represents a p-th element of the feature vector with respect to speaker "l" at time "t." Provided that the number of mean vector dimension is taken as "d" and the number of standard patterns to be stored is taken as "L," the required number of data sets regarding A(l) and v(l) stored in the speaker-dependent conversion factor storage means 3 is expressed as [(d×d+d)×L+the number of initial HMM Gaussian distributions×d]. For example, provided that the number of initial HMM Gaussian distributions=810, d=34, and L=484, as in the case of the conventional speaker adaptation device, the amount of data sets to be stored assumes a value of 603,500 [=(34×34+34)× 484+810×34]. The amount of data to be stored becomes smaller than that required by the conventional speaker-adapted device, i.e., 13,329,360.

Figure 4B:
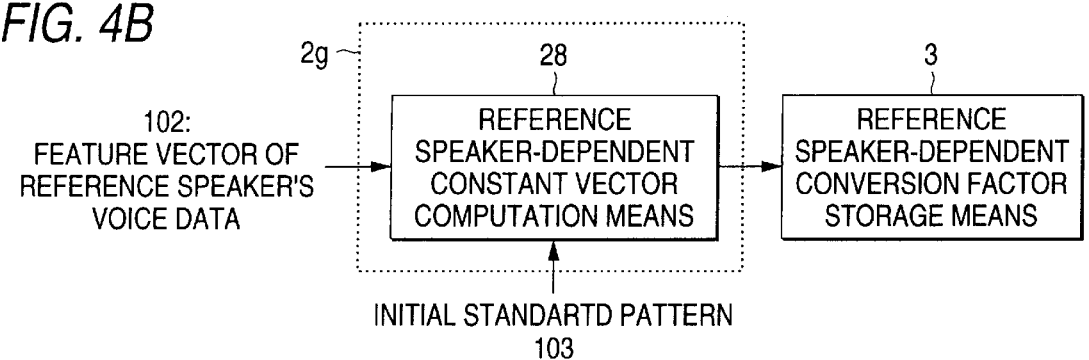

As shown in FIG. 4B, the reference speaker-dependent conversion factor computation means 2 may be formed as reference speaker-dependent conversion factor computation means 2g. The reference speaker-dependent conversion factor computation means 2g comprises reference speaker-dependent constant vector computation means 28, which will be provided separately. Through use of the reference speaker voice data feature quantity vector 102 and the initial standard pattern 103, the reference speaker-dependent constant vector computation means 28 computes a reference speaker-dependent conversion factor v(l) based only on the conversion constant vector depending on each reference speaker. The thus-computed reference speaker-dependent conversion factor v(l) is output to the reference speaker-dependent conversion coefficient storage means 3. By means of computation of only a conversion constant vector, the number of data sets required for storing standard patterns beforehand can be reduced to a much greater extent.

For example, when converting, for each reference speaker, the Gaussian distribution mean vectors of HMM of the initial standard pattern 103 is the conversion parameters, the reference speaker-dependent constant vector computation means 28 obtains the conversion constant vector v(l) that generate the l-th reference speaker-dependent mean vector $\mu$l (j,k) of k-th mixture in state j by conversion of initial mean $\mu$i(j,k) of initial standard pattern 103 by using Equation 3(1). Here, $\mu$i(j,k) and $\mu$al(j,k) represent d-dimensional vectors; and v(l) represents a d-dimensional constant vector.

As shown in Equation 3(2), an element function of an output probability density function of a feature vector o(l,t) in the Gaussian distribution "k" in state "j" is defined with regard to v(l), through computation of, e.g., HMM probability described in the foregoing mapping publication. Subsequently, as shown in Equation 3(3), v(l) is subjected to partial differentiation and is taken as equaling zero on the basis of the output probability density function, through use of an initial HMM$\lambda$i of the initial standard pattern 103 and the reference speaker voice data feature vectors o(l,1) to o(l,T1)102, whereby v(l) representing the maximum value of a "Baum's auxiliary function" is computed. Further, as can be seen from Equation 3(4) derived from Equation 3(3), a p-th element of v(l) v(l,p) is computed. Here, $\mu$i(j,k,r) represents the r-th element of an initial HMM mean vector $\mu$i(j,k) in the Gaussian distribution "k" in state "j"; and $\sigma^2$ (j,k,p) represents a (p,p) element of a covariance matrix Ui(j,k). Provided that the number of mean vector dimension is taken as "d" and the number of standard patterns to be stored is taken as "L," the required number of data sets regarding v(1) stored in the speaker-dependent conversion factor storage means 3 is expressed as [d×L+the number of initial HMM Gaussian distributions×d]. For example, provided that the number of initial HMM Gaussian distributions=810, d=34, and L=484, as in the case of the conventional speaker adaptation device, the amount of data sets to be stored assumes a value of 43,996 [=34×484+810× 34]. The amount of data to be stored becomes smaller than that required by the conventional speaker-adapted device, i.e., 13,329,360.

Figure 4C:
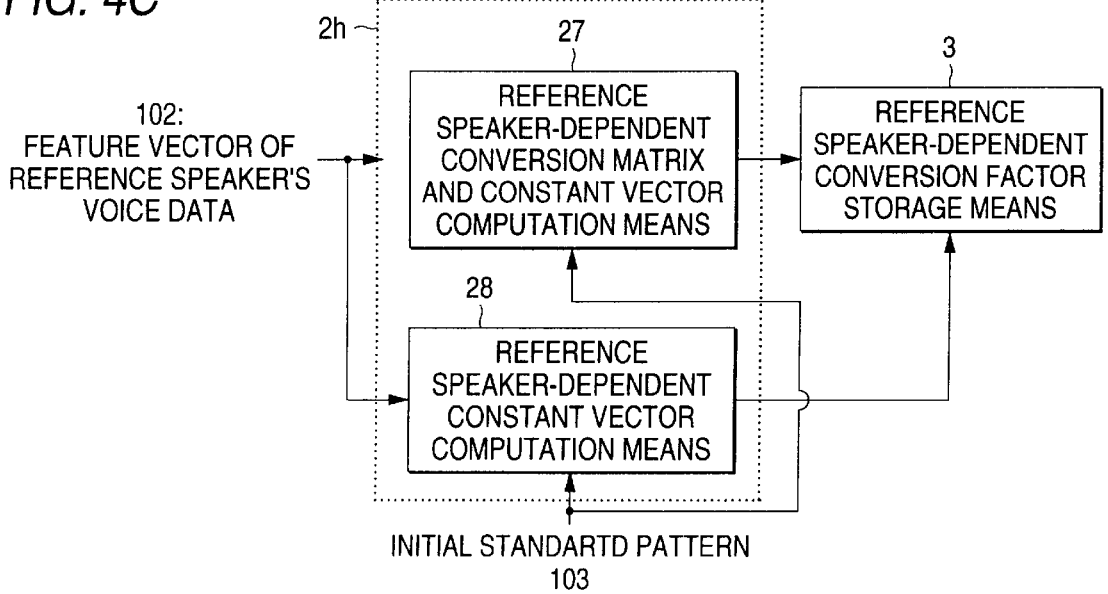

As shown in FIG. 4C, the reference speaker-dependent conversion factor computation means 2 may be formed as reference speaker-dependent conversion factor computation means 2h, which will be provided separately. The reference speaker-dependent conversion factor computation means 2h comprises the reference speaker-dependent conversion matrix and constant vector computation means 27 and the reference speaker-dependent constant vector computation means 28. By means of computation in which the conversion matrix and constant vector and the reference speaker-dependent constant vector are used, the number of data sets required for storing standard patterns beforehand can be reduced to a much greater extent.

Provided that the number of mean vector dimension is taken as "d" and the number of standard patterns to be stored is taken as L (L=L1+L2), the number of data sets required for a number L1 of reference speaker-dependent conversion factors A(l) and v(l) based on the conversion matrix and the constant vector stored in the speaker-dependent conversion storage means 3 and the number of data sets required for a number L2 of reference speaker-dependent conversion factors v(l) are expressed as [(d×d+d)×L1+d×L2+the number of initial HMM Gaussian distributions×d]. For example, provided that the number of initial HMM Gaussian distributions=810, d=34, and L=484 (L1=242, L2=242), as in the case of the conventional speaker-adapted device, the amount of data sets to be stored assumes a value of 323,748 [=(34×34+34)×242+34×242+810×34]. The amount of data to be stored still becomes smaller than that required by the conventional speaker-adapted device, i.e., 13,329,360.

(Equation 2)

$$ual(j, k) = A(l)ui(j, k) + v(l) \qquad (1)$$

$$N(o(l, t) | \mu i(j, k), Ui(j, k)) = \frac{1}{(2\pi)^{d/2}|Ui(j, k)|^{1/2}} \times \qquad (2)$$
$$e^{-\frac{1}{2}\{o(l,t)-(A(l)\mu i(j,k)+v(l))\}^t Ui(j,k)^{-1}\{o(l,t)-(A(l)\mu i(j,k)+v(l))\}}$$

-continued $$Q(\lambda_i, \lambda_i') = \sum_{B \in \theta} F(O(l), \theta | \lambda_i) \log F(O(l), \theta | \lambda_i') \quad (3)$$

$$\frac{dQ}{dA(l)} = F(O(l)|\lambda_i) \sum_{j=1}^{L} \sum_{k=1}^{K} \sum_{t=1}^{T_l} \gamma(t, j, k) Ui(j, k)^{-1} \times$$

$$[o(t, l) - (A(l)\mu i(j, k) + v(l))]\mu i(j, k)^t = 0$$

$$\frac{dQ}{dv(l)} = F(O(l)|\lambda_i) \sum_{j=1}^{L} \sum_{k=1}^{K} \sum_{t=1}^{T_l} \gamma(t, j, k) Ui(j, k)^{-1} \times \quad (4)$$

$$[o(t, l) - (A(l)\mu i(j, k) + v(l))] = 0$$

$$\begin{pmatrix} a(l, p, 1) \\ a(l, p, 1) \\ \vdots \\ a(l, p, d) \\ a(l, p) \end{pmatrix} =$$

$$\begin{pmatrix} g(l,1,1) & g(l,1,2) & \cdots & g(l,1,d+1) \\ g(l,2,1) & g(l,2,2) & \cdots & g(l,2,d+1) \\ \vdots & \cdots & & \vdots \\ g(l,d,1) & g(l,d,2) & \cdots & g(l,d,d+1) \\ g(l,d+1,1) & g(l,d+1,2) & \cdots & g(l,d+1,d+1) \end{pmatrix}^{-1} \begin{pmatrix} z(l,1) \\ z(l,2) \\ \vdots \\ z(l,d) \\ z(l,d+1) \end{pmatrix}$$

$$g(l, r, s) = \sum_{j=1}^{J} \sum_{k=1}^{K} \sum_{t=1}^{T_l} \gamma(t, j, k) \frac{\mu i(j, k, r)\mu i(j, k, s)}{\sigma^2(j, k, p)}, (1 \le r, s \le d)$$

$$g(l, r, d+1) = g(l, d+1, r)$$

$$= \sum_{j=1}^{J} \sum_{k=1}^{K} \sum_{t=1}^{T_l} \gamma(t, j, k) \frac{\mu i(j, k, r)}{\sigma^2(j, k, p)}, (1 \le r, s \le d)$$

$$g(l, d+1, d+1) = \sum_{j=1}^{J} \sum_{k=1}^{K} \sum_{t=1}^{T_l} \gamma(t, j, k) \frac{1}{\sigma^2(j, k, p)} \quad (5)$$

$$z(l, r) = \sum_{j=1}^{J} \sum_{k=1}^{K} \sum_{t=1}^{T_l} \gamma(t, j, k) \frac{o(l, t, p)\mu i(j, k, r)}{\sigma^2(j, k, p)}, (1 \le r, s \le d)$$

$$z(l, d+1) = \sum_{j=1}^{J} \sum_{k=1}^{K} \sum_{t=1}^{T_l} \gamma(t, j, k) \frac{o(l, t, p)}{\sigma^2(j, k, p)}$$

(Equation 3)

$$\mu al(j, k) = \mu i(j, k) + v(l) \quad (1)$$

$$N(o(l, t) | \mu i(j, k), Ui(j, k)) = \quad (2)$$

$$\frac{1}{(2\pi)^{d/2}|Ui(j,k)|^{1/2}} \times e^{-\frac{1}{2}[o(l,t)-(\mu i(j,k)+v(l))]^t Ui(j,k)^{-1}[o(l,t)-(\mu i(j,k)+v(l))]}$$

$$\frac{dQ}{dv(l)} = F(O(l)|\lambda_i) \sum_{j=1}^{L} \sum_{k=1}^{K} \sum_{t=1}^{T_l} \gamma(t, j, k) Ui(k)^{-1} \times \quad (3)$$

$$[o(t, l) - (\mu i(j, k) + v(l))] = 0$$

$$v(l, p) = \frac{\sum_{j=1}^{J} \sum_{k=1}^{K} \sum_{t=1}^{T_l} \frac{\gamma(t, j, k)(o(l, t, p) - \mu i(j, k, p))}{\sigma^2(j, k, p)}}{\sum_{j=1}^{J} \sum_{k=1}^{K} \sum_{t=1}^{T_l} \frac{\gamma(t, j, k)}{\sigma^2(j, k, p)}} \quad (4)$$

Figure 5:
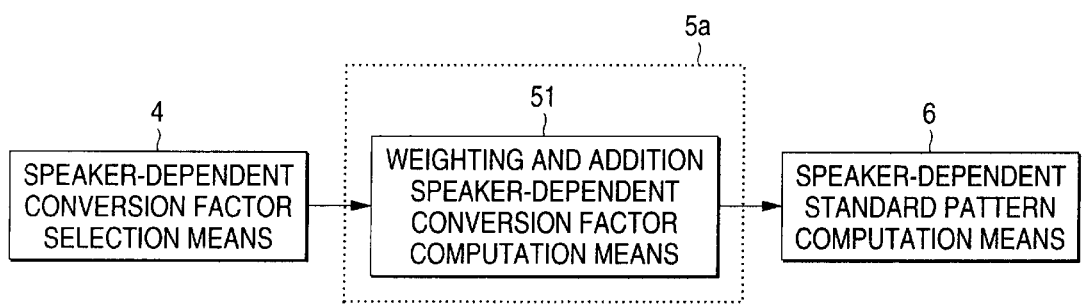
FIG. 5 is a block diagram for describing another modification of the speaker-dependent conversion factor computation means shown in FIG. 1.

The speaker-dependent conversion factor means 5 according to the present embodiment shown in FIG. 1 may be formed as speaker-dependent conversion factor computation means 5a. As shown in FIG. 5, the speaker-dependent conversion factor computation means 5a comprises weighting and addition speaker-dependent conversion factor computation 51. The weighting and addition speaker-dependent conversion factor means 51 subjects one or more sets of reference speaker-dependent conversion factors Trc(1) to Trc (Lc) selected by the speaker-dependent conversion factor selection means 4, thereby producing one or more sets of speaker-dependent conversion factor.

$$Tm = \sum_{l=1}^{Lc} wl \cdot Trc(l)$$

$$wl = F(l) \bigg/ \sum_{p=1}^{Lc} F(p)$$

(where wl represses a weight coefficient satisfying $$\sum_t wl = 1.0)$$

The thus-produced speaker-dependent conversion factor is output to the speaker-dependent standard pattern computation means 6. As a result of weighted averaging of the reference greater extent.

In the computation of probability at the time of selection of speaker-dependent factors Trcml(1) to Trcml (Lc) of Lc set by means of the speaker-dependent conversion factor selection means according to the probability standards provided below, if the probabilities are taken as F(1) to F(Lc) the weighting coefficients are expressed as $$\omega l = F(l) \bigg/ \sum_p F(p)$$

(where p=1 to Lc). This means that the weighting coefficient wl becomes greater as the speaker-dependent factor has higher probability. The weighting coefficient may be computed through use of the similarity produced by speaker-dependent conversion factor selection means 4a according to the conversion factor similarity standards provided below.

Figure 6A:
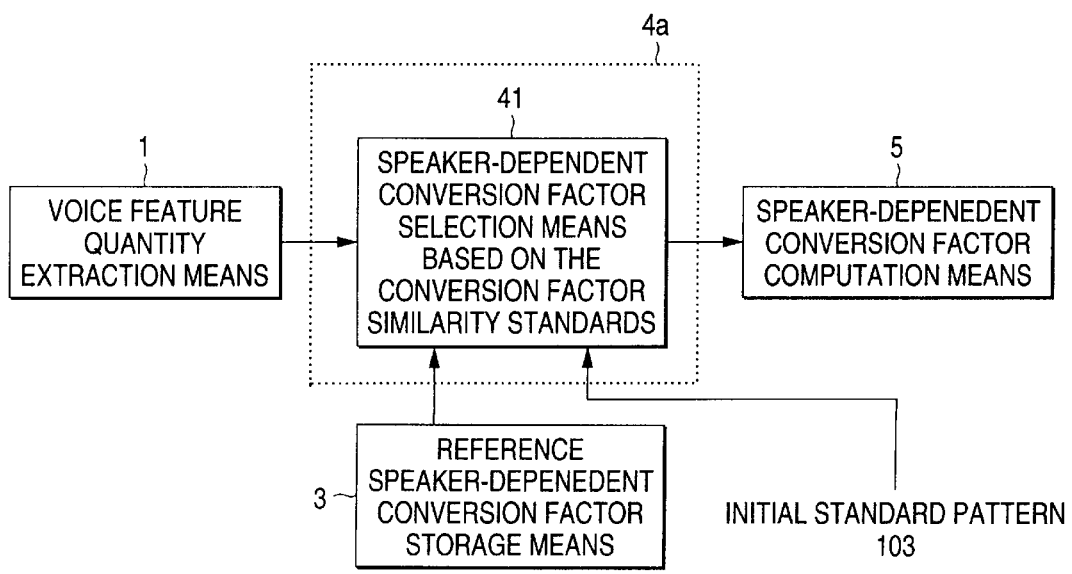
FIGS. 6A to 6C are block diagrams for describing other three modifications of the speaker-dependent conversion factor computation means shown in FIG. 1.

As shown in FIG. 6A, the speaker-dependent conversion factor selection means 4 according to the present embodiment shown in FIG. 1 may be formed as the speaker-dependent conversion factor selection means 4a. The speaker-dependent conversion factor selection means 4a comprises speaker-dependent conversion factor selection means 41 based on the conversion factor similarity standards, which will be provided separately. The speaker-dependent conversion factor selection means 41 computes similarity between the reference speaker-dependent conversion factors Tr(1) to Tr(L) stored in the reference speaker-dependent factor storage means 4 and the feature vector time-series data extracted by the voice feature quantity extraction means 1 and the speaker-dependent conversion factor Tru produced on the basis of the initial standard pattern 103, which will be prepared separately. One or more reference speaker-dependent conversion factors Trcd(1) to Trcd(Lc) having greater conversion factor similarity are selected and output to the speaker-dependent conversion factor computation means 5. Since one or more sets of reference speaker-dependent conversion factors having great conversion factor similarity are selected through conversion factor similarity computation, the number of data sets required for storing the standard patterns beforehand can be reduced to a much greater extent.

For example, in a case where the conversion factor is a constant vector and where a speaker/reference speaker-dependent constant vector is vu/v(l), the speaker-dependent conversion factor selection means 41 based on the conversion factor similarity standards selects an Lc (Lc≧1) number of reference speaker-dependent conversion factors Trcd(1) to Trcd(Lc) from vectors having a short Euclidean distance D(l)=|vll−v(l)|.

Figure 6B:
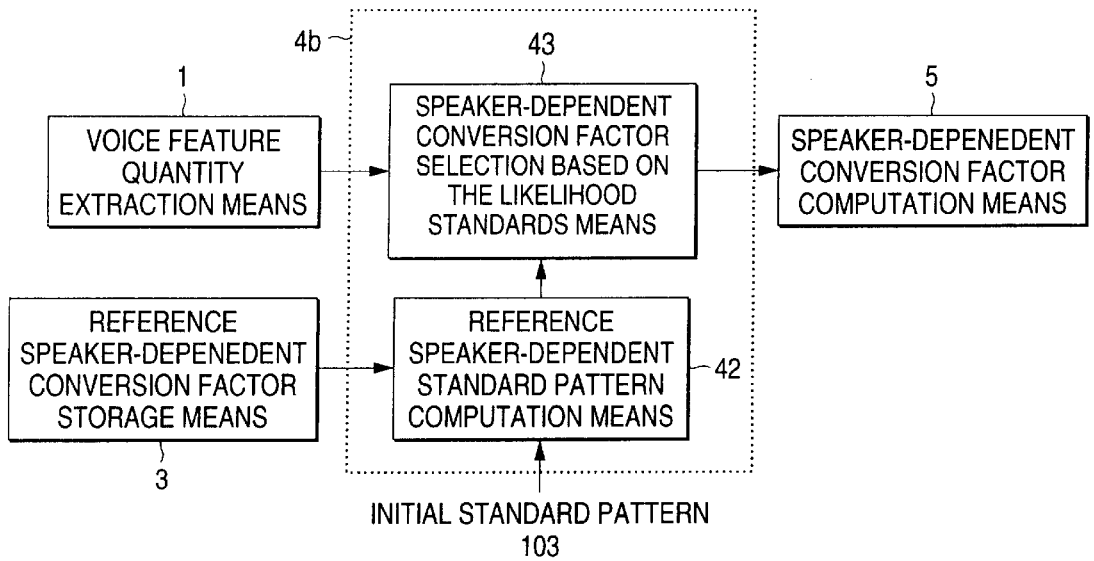

Further, as shown in FIG. 6B, the speaker-dependent conversion factor selection means 4 according to the present embodiment shown in FIG. 1 may be formed as speaker-dependent conversion factor selection means 4b. The speaker-dependent conversion factor selection means 4b comprises reference speaker-dependent standard pattern computation means 42 and speaker-dependent conversion factor selection based on the likelihood standards means 43, both of which will be provided separately. The reference speaker-dependent standard pattern computation means 42 prepares reference speaker-dependent conversion standard patterns λr(1) to λr(L) on the basis of the reference speaker-dependent conversion factors Tr(1) to Tr(L) stored in the reference speaker-dependent conversion factor storage means 3, as well as on the basis of the initial standard pattern 103, which will be provided separately. The speaker-dependent conversion factor selection based on the likelihood standards means 43, which will be provided separately, computes the likelihood of the reference speaker-dependent standard patterns λr(1) to λr(L) computed by the reference speaker-dependent standard pattern computation means 42, with regard to the feature vector time-series data Ou extracted by the voice feature quantity extraction means 1 (for further information about likelihood computation in the case of a HMM, see "Fundamentals of Speech Recognition" mentioned previously). The speaker-dependent conversion factor selection based on the likelihood standards means 43 selects one ore more reference speaker standard pattern conversion factors Trcml(1) to Trcml(Lc) in order of likelihood from highest to lowest. The thus-selected reference speaker standard patterns are output to the speaker-dependent conversion factor computation means 5. Since one or more sets of reference speaker standard pattern conversion factors having greater likelihood are selected through likelihood computation, the number of data sets required for storing the standard patterns beforehand can be reduced to a much greater extent.

Figure 6C:
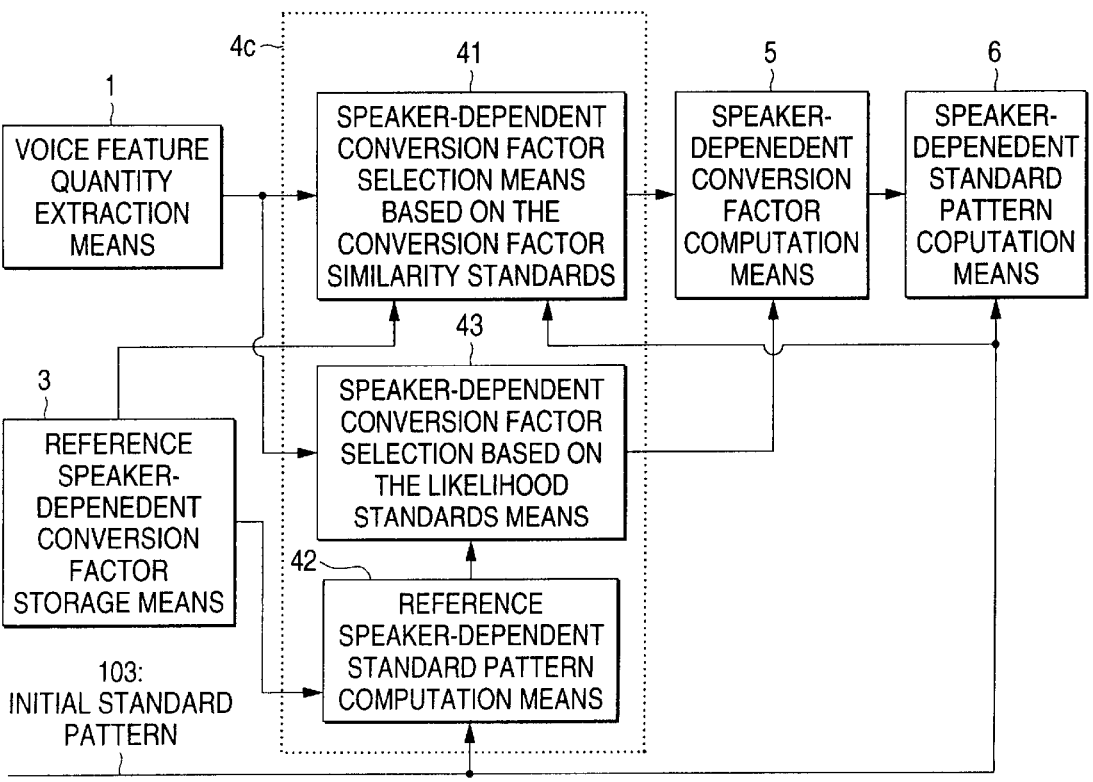

Further, as shown in FIG. 6C, the speaker-dependent conversion factor selection means 4 may be formed into speaker-dependent conversion factor selection means 4c, which will be provided separately. The speaker-dependent conversion factor selection means 4c comprises the speaker-dependent conversion factor selection means 41 based on the conversion factor similarity standards, the reference speaker-dependent standard pattern computation means 42, and the speaker-dependent conversion factor selection based on the likelihood standards means 43, all of which are shown in FIGS. 6A and 6B. Since an Lc1 (Lc≧1) number of reference speaker-dependent conversion factors having conversion factor similarity and an Lc2(Lc≧2) number of reference speaker standard pattern conversion factors having greater likelihood are selected through conversion factor similarity computation and likelihood computation, the number of data sets required for storing the standard patterns beforehand can be reduced to a much greater extent.

For example, the continues mixture distribution HMM (hidden Markov Model) described in detail in the "Fundamentals of Speech Recognition" may also be used as the initial standard pattern 103 according to the present embodiment shown in FIGS. 1 through 6. As a result of computation which uses the continuous mixture distribution HMM, the number of data sets required for storing the standard patterns beforehand can be reduced to a much greater extent.

The reference speaker-dependent conversion factor computation means 2 and 2a to 2h according to the present embodiment shown in FIGS. 1 through 6 may compute reference speaker-dependent conversion factors used for converting a mean vector of a Gaussian distribution function or a Laplace distribution function (for further information about the function, see "Fundamentals of Speech Recognition" mentioned previously) constituting the continuous mixture distribution HMM symbol output probability density function used as the initial standard pattern 103. By means of the reference speaker-dependent conversion factor being computed through mean vector conversion, the number of data sets required for storing the standard patterns beforehand can be reduced to a much greater extent.

In a case where the Gaussian distribution function is an element distribution constituting the symbol output probability density function, provided that a mean vector of Gaussian distribution "k" in state "j" is $\mu$ (j,k); a covariance matrix is taken as U(j,k); the number of mean vector dimensions is taken "d"; and a symbol is taken as "o," the Gaussian distribution is given by Equation 4(1) Further, the output probability bj (o) of symbol "o" in state "j" is expressed as Equation 4(2). Here, "K" represents the number of mixture distributions in state "j," and c(j,k) represents a mixture weighting coefficient.

(Equation 4)

$$N(o \mid \mu(j, k), U(j, k)) = \frac{1}{(2\pi)^{d/2} |U(j, k)|^{1/2}} \times \exp\left[-\frac{1}{2}(o - \mu(j, k))^t U^{-1}(j, k)(o - \mu(j, k)))\right] \quad (1)$$

$$b_j(o) = \sum_{k=1}^{K} c(j, k) N(o \mid \mu(j, k), U(j, k)) \quad (2)$$

Figure 8:
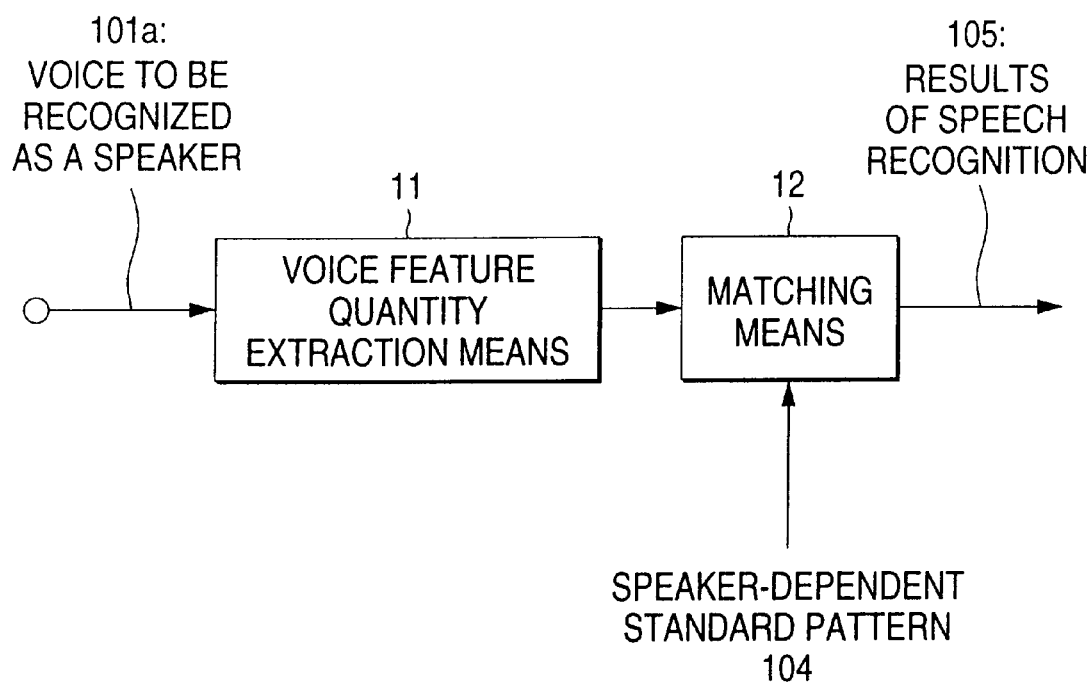
FIG. 8 is a block diagrams for describing a speech recognition device which employs a speaker-adaptation method based on a standard pattern selection method according to the prior art.

The speech recognition device according to the embodiment of the present invention may employ a speaker-dependent standard pattern 104 produced by a speaker adaptation device which employs the data reduction standard pattern selection method shown in FIGS. 1 through 6, in place of the conventional speaker adaptation device using the standard pattern selection method shown in FIG. 8. As a result, there can be implemented a speech recognition device which yields the advantageous result equal to that yielded by the speaker adaptation method based on the data reduction standard pattern selection method.

The speaker adaptation device and the speech recognition device according to the present invention employ a speaker adaptation method, in which a plurality of conversion factors representing standard patterns are prepared beforehand, and a conversion factor is selected according to the characteristics of the speaker. Under the conventional method, a plurality of reference speaker-dependent standard patterns are prepared beforehand through use of a hidden Markov model, and a speaker-dependent standard pattern is selected according to the characteristics of the speaker. Therefore, compared with the conventional method, the speaker adaptation method according to the present invention enables a reduction in the number of data sets required for storing standard patterns beforehand. Further, the foregoing modifications of the present invention enable a further reduction in the number of data sets by means of additional computation provided below.

(1) Computation of a conversion factor for each reference speaker;

(2) Computation of a conversion factor for each reference speaker group consisting of a plurality of reference speakers;

(3) Combined computation described in (1) and (2);

(4) Computation of a conversion factor for each initial standard pattern parameter group to be divided into a plurality of segments;

(5) Combined computation described in (2) and (4);

(6) Computation of a conversion matrix and a conversion constant vector on the basis of a multiple regression mapping model;

(7) Computation of only the conversion constant vector described in (6);

(8) Combined computation described in (6) and (7);

(9) Computation of conversion factor similarity;

(10) Computation of likelihood;

(11) Combined computation described in (9) and (10);

(12) Weighted mean computation of a reference speaker-dependent conversion coefficient;

(13) Computation based on a continuous mixed distribution hidden Markov model; and

(14) Mean vector conversion computation of a reference speaker-dependent conversion factor.

What is claimed is:

1. A speaker adaptation device comprising:

a voice feature quantity extractor which extracts feature vector time-series data by acoustic feature quantity analysis of a speaker's voice;

a reference speaker-dependent conversion factor computation device which computes reference speaker-dependent conversion factors through use of a reference speaker voice data feature vector and an initial standard pattern;

a reference speaker-dependent conversion factor storage device which stores the reference speaker-dependent conversion factors computed by the reference speaker-dependent conversion factor computation device;

a speaker-dependent conversion factor selector which selects one or more sets of reference speaker-dependent conversion factors from the reference speaker-dependent conversion factors stored in the reference speaker-dependent conversion factor storage device, with regard to the feature vector time-series data extracted by the voice feature quantity extractor;

a speaker-dependent conversion factor computation device which computes speaker-dependent conversion factors through use of the selected one or more sets of the reference speaker-dependent conversion factors; and speaker-dependent standard pattern computation device which converts parameters of the initial standard pattern through use of the speaker-dependent conversion factors computed by the speaker-dependent conversion factor computation device and which outputs a speaker-dependent standard pattern.

2. The speaker adaptation device as defined in claim 1, wherein the reference speaker-dependent conversion factor computation device computes, with regard to the reference speaker voice data feature vector, reference speaker-dependent conversion factors for each reference speaker, each reference speaker group including a plurality of reference speakers, or each reference speaker as well as each reference speaker group including a plurality of reference speakers; and wherein the computed reference speaker-dependent conversion factors are stored in the reference speaker-dependent conversion factor storage device.

3. The speaker adaptation device as defined in claim 1, wherein the reference speaker-dependent conversion factor computation device computes reference speaker-dependent conversion factors for each parameter group divided into a plurality of segments with regard to the initial standard pattern, or each reference speaker group including reference speakers with regard to the reference speaker data feature vector as well as each parameter group divided into a plurality of segments with regard to the initial standard pattern; and wherein the computed reference speaker-dependent conversion factors are stored in the reference speaker-dependent conversion factor storage device.

4. The speaker adaptation device as defined in claim 1, wherein the reference speaker-dependent conversion factor computation device computes reference speaker-dependent conversion factors based on a computation using a conversion matrix and a constant vector, both of which depend on each reference speaker, based on a computation using only a conversion constant vector depending on each reference speaker, or based on a combined computation of a conversion matrix and a constant vector, both of which depend on each reference speaker, and a conversion constant vector depending on each reference speaker; and wherein the computed reference speaker-dependent conversion factors are stored in the reference speaker-dependent conversion factor storage device.

5. The speaker adaptation device as defined in claim 1, wherein the speaker-dependent conversion factor selector selects one or more reference speaker-dependent conversion factors having conversion factor similarity by computation of a similarity between the speaker-dependent conversion factors which are produced through use of the feature vector time-series data extracted by the voice feature quantity extractor and the initial standard pattern and the reference speaker-dependent conversion factor stored in the reference speaker-dependent conversion factor storage device, one or more reference speaker standard pattern conversion factors in order of likelihood from a largest to a lowest by computation of likelihood of the feature vector time-series data extracted by the voice feature quantity extractor with regard to the reference speaker-dependent standard pattern produced through use of the reference speaker-dependent conversion factor stored in the reference speaker-dependent conversion factor storage device and the initial standard pattern, or one or more reference speaker standard pattern conversion factors having conversion factors similarity from a largest conversion factor similarity to a lowest conversion factor similarity, and likelihood; and wherein the speaker-dependent conversion factor computation device computes speaker-dependent conversion factors through use of the selected one or more reference speaker standard pattern conversion factors.

6. The speaker adaptation device as defined in claim 1, wherein the speaker-dependent conversion factor computation device subjects to weighted averaging operations the one or more sets of reference speaker-dependent conversion factors selected by the speaker-dependent conversion factor selector, thereby computing one or more sets of speaker-dependent conversion factors.

7. The speaker adaptation device as defined in claim 1, wherein a continuous mixture distribution hidden Markov model is used as the initial standard pattern.

8. The speaker adaptation device as defined in claim 7, wherein the reference speaker-dependent conversion factor computation device computes a reference speaker-dependent conversion factor which converts a mean vector, by means of an element distribution function constituting a symbol output probability density function of the continuous mixture distribution hidden Markov model used as the initial standard pattern, comprising a Gaussian distribution function or a Laplace distribution function.

9. The speaker adaptation device of claim 1, wherein said speaker adaptation device is Part of a speech recognition device.

10. A speaker adaptation device comprising:
- a reference speaker-dependent conversion factor storage unit that stores reference speaker-dependent conversion factors;
- a speaker-dependent conversion factor computation device, which computes speaker-dependent conversion factors using select reference speaker-dependent conversion factors from said reference speaker-dependent conversion factor storage unit;
- a speaker-dependent standard pattern computation device which computes a speaker-dependent standard pattern based on said speaker-dependent conversion factors computed by said speaker-dependent conversion factor computation device and an initial standard pattern.

* * * * *